May 1, 1934.　　A. JACKSON ET AL　　1,956,797
LIFT
Filed Feb. 21, 1933　　2 Sheets-Sheet 1
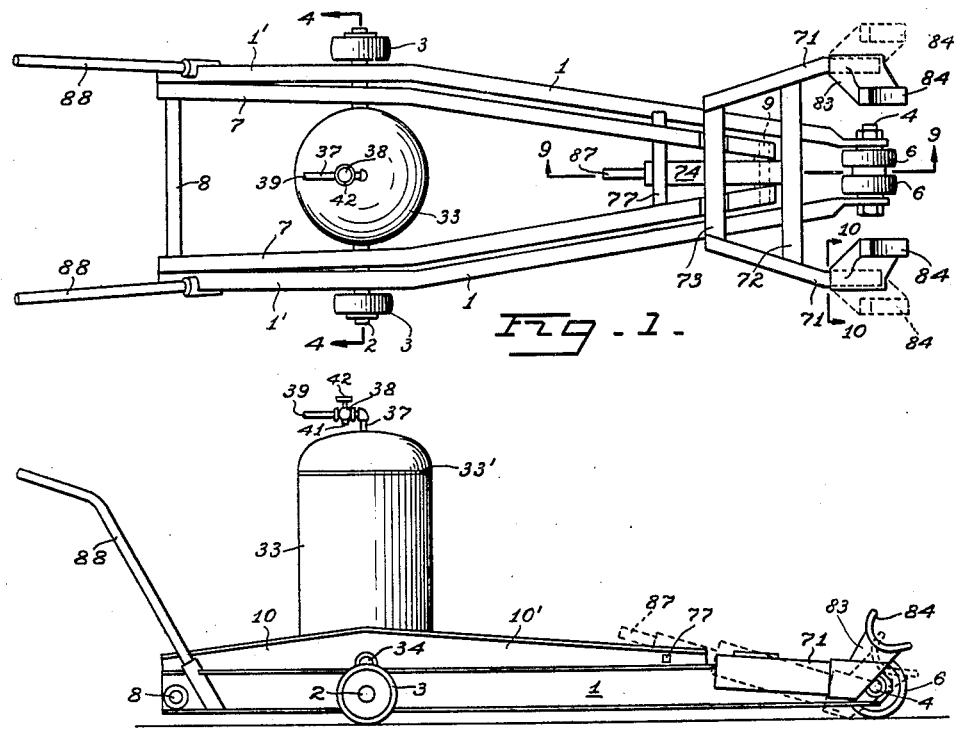
Fig. 1.
Fig. 2.
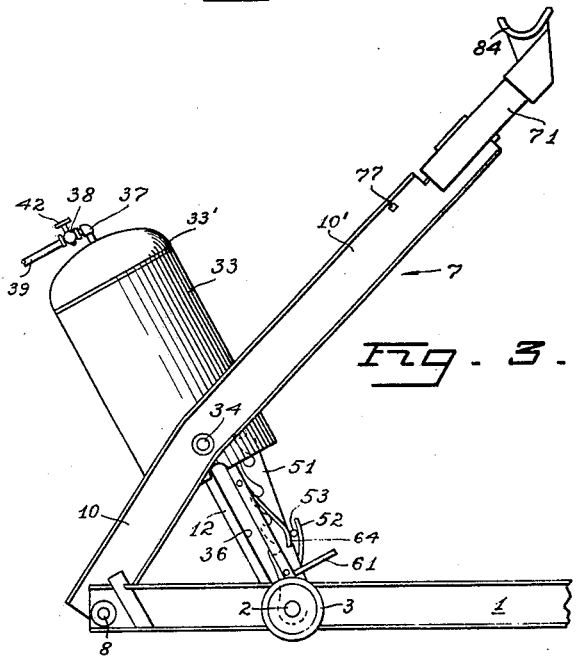
Fig. 3.
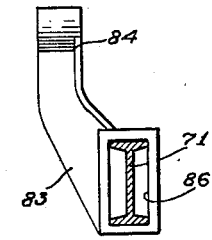
Fig. 10.
INVENTORS
ALEXIS JACKSON
OSCAR L. TENNANT
BY Charles M Frizer
ATTORNEY May 1, 1934.   A. JACKSON ET AL   1,956,797
LIFT
Filed Feb. 21, 1933   2 Sheets-Sheet 2
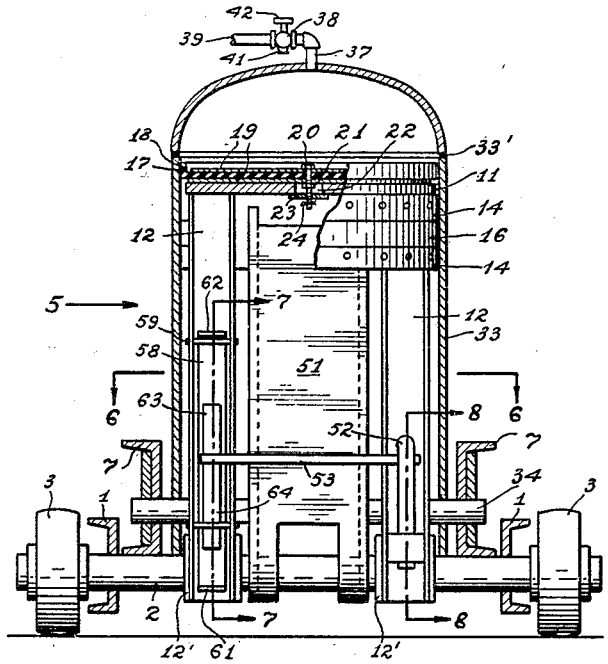
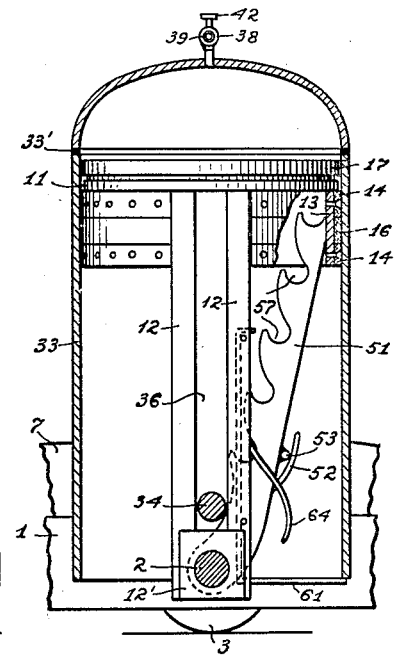
Fig. 4.   Fig. 5.
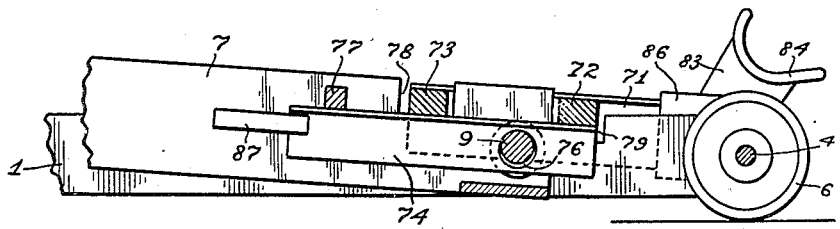
Fig. 9.
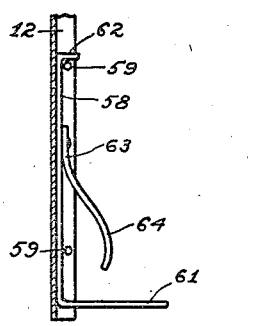
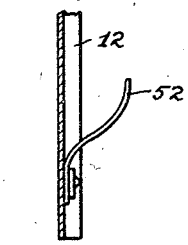
Fig. 7.   Fig. 8.   Fig. 6.
INVENTORS
ALEXIS JACKSON
OSCAR L. TENNANT
BY Charles M Fryer
ATTORNEY Patented May 1, 1934

1,956,797

UNITED STATES PATENT OFFICE 1,956,797

LIFT

Alexis Jackson and Oscar L. Tennant, San Francisco, Calif., assignors to Tennant Hi-Jack Company, Inc., San Francisco, Calif., a corporation of California Application February 21, 1933, Serial No. 657,766

9 Claims. (Cl. 254—3)

Our invention relates to lifts, and particularly to a portable lift capable of being operated by fluid pressure and of the type disclosed in our co-pending applications, Serial No. 561,570, filed September 8, 1931, and Serial No. 576,700, filed November 23, 1931. The invention in this application is for improvements over the lifts disclosed in our earlier filed applications.

An important object of the invention is the provision of a lift, which can be used around garages for lifting the ends of vehicles, such as automobiles, and which can be operated by pneumatic pressure obtained from a source commonly employed for inflating automobile tires.

Another object of our invention is the provision of a lift, which is light and readily portable, so that it can be moved from place to place.

Another object of our invention is the provision of a lift, which is composed of few and simple parts, and which can be economically manufactured.

Another object of our invention is to provide a lift, of the character described, which is stable under a load regardless of unevenness of the floor upon which the lift may rest.

Another object of the invention is the provision, in a pneumatic lift of the character described, of means independent of the pneumatic means for supporting the lift under load; and particularly to an improved type of such means.

Another object of the invention is the provision of supporting means, particularly adapted for holding the front or rear axle of a vehicle, such as an automobile, with facility and stability; and especially to an improved type of such supporting means which will allow lowering or tipping of the supporting means under obstructions which might be in front of an axle.

A further object of the invention is the provision of spaced supporting brackets or saddles on said supporting means, the space between which can be varied to accommodate various types of axles.

An additional object of the invention is the provision of an improved piston construction.

Additional objects of the invention will become apparent from a perusal of the following description thereof.

Referring to the drawings:

Fig. 1 is a top plan view of the lift of our invention, showing the lifting arm in lowered position.

Fig. 2 is a side elevational view of the lift, illustrated in Fig. 1.

Fig. 3 is a fragmentary side elevational view of the lift, illustrating the lifting arm in an elevated position.

Fig. 4 is a vertical sectional view, partly in elevation, taken in a plane indicated by line 4—4 of Fig. 1.

Fig. 5 is a side elevation, partly in section, looking in the direction of arrow 5 in Fig. 4, with one side of the cylinder wall omitted from the view.

Fig. 6 is a horizontal sectional view, on a reduced scale, taken in a plane indicated by line 6—6 of Fig. 4.

Fig. 7 is a fragmentary sectional elevation taken in a plane indicated by line 7—7 of Fig. 4.

Fig. 8 is similar view to that of Fig. 7, taken in a plane indicated by line 8—8 of Fig. 4.

Fig. 9 is a longitudinal sectional elevation taken in a plane indicated by line 9—9 in Fig. 1.

Fig. 10 is a sectional view taken along line 10—10 of Fig. 1, illustrating an end of one of the saddles or brackets, on the forked vehicle supporting means.

In general terms, the lift of our invention comprises a carriage upon which is movably mounted a lifting arm to effect elevation of the object lifted. Fluid operable means, including a piston and a cylinder mounted for relative sliding movement, is connected to the arm and carriage to cause elevation of the arm upon application of fluid pressure, such as air pressure. Means independent of the fluid operable means, is provided for supporting the arm in elevated position. Such means includes a ratchet which is urged by spring means to a position for automatically supporting the lifting arm when elevated, together with means for automatically insuring that the ratchet is in effective operative position when the lift is lowered and ready for a succeeding lifting operation.

The carriage or frame is preferably substantially triangular in shape, that is, it has a three point support therefor upon the ground or floor. This lends stability to the structure when the lifting arm is elevated under load, particularly if the surface upon which the carriage rests happens to be rough or wavey, as frequently occurs with respect to cement or concrete garage floors. However, the portion of such triangularly shaped carriage on which the piston and cylinder find their support, is preferably rectangular or box shaped, to insure a firm foundation therefor.

Preferably, the piston is of such construction as to facilitate manufacture and insure a tight non-metal fit between the piston and the cylinder. For this purpose the piston has spaced bands of fibrous material, such as leather, and a band of fibrous material which readily absorbs lubricant, such as felt, interposed between the leather bands, which bands are adapted to contact the wall of the cylinder. A floating seal of resilient material, such as rubber, is mounted on the top of the piston to provide for an anti-leak fit at all times between the cylinder and the piston.

Since our lift is applicable for elevating the ends of automobiles, we employ at the free end of the lifting arm, means particularly adapted for supporting the vehicle on its axle. This means preferably comprises a support which is mounted for movement in such manner relative to the arm so that the support can shift to positions which the vehicle, as it is being lifted causes it to assume, thus reducing to a minimum stresses upon the apparatus. In some instances vehicles are built with obstructions in front of the axles; and so that the support can be inserted to clear the obstructions, we also provide means for mounting the support to permit tilting or tipping thereof under the axle.

The support is, preferably, forked, to provide means for holding the axle at two spaced positions; and the ends of the support are provided with curved brackets or saddles for holding securely the vehicle axle in any position of elevation. The curved portion of each bracket is offset and the brackets are removably mounted; so that by inter-change thereof, the space between the brackets can be varied to accommodate various axle constructions.

With reference to the drawings, the preferred construction of our lift will now be described. The lift comprises a carriage of substantially triangular shape including the spaced frame members 1, which adjacent their rear ends have parallel portions $1^1$ to form a box-like rectangularly shaped frame portion. In this frame portion and adjacent the rear end of the carriage, is mounted an axle 2, extending transversely across the frame members, and upon the ends of which are journaled rollers 3. The front ends of frame members 1 converge and are connected by the axle 4, upon which is journaled the roller wheels 6 positioned between the frame members 1 and midway between the pair of rollers 3. Pivotally connected to the carriage, adjacent the rear end thereof and between frame members 1, are the lifting arms 7, mounted on rod 8 which is journaled on the carriage. The lifting arms also converge toward the front of the carriage, and are joined together, at their free ends by the pin 9.

As can be seen more clearly from Fig. 2, each lifting arm 7 has an upwardly extending rear portion 10 and a downwardly extending front portion $10^1$, making a comparatively large obtuse angle with respect to each other. This allows the lifting arm to be pivoted closely adjacent the bottom of the carriage to provide for maximum degree of lift.

Means (preferably pneumatic having its source exterior to the lift itself, and which is most convenient and economical due to the common presence thereof in garages and service stations where our device finds great applicability) is provided for elevating the lifting arm to any desired position. This means comprises a piston head 11, on the underside of which are secured, preferably by welding, spaced pairs of spaced channel bars 12 which form supporting walls for the piston. The lower ends of each pair of bars 12 are secured to bearing $12^1$ journaled on axle 2 to allow pivotal or rocking movement of the piston on the carriage. Mounting of the piston on axle 2 on the box portion of the carriage, makes for a rigid and strong construction.

The piston is adapted to slide relative to a cylinder; and to provide non-metal contact between the cylinder and the piston, arcuate skirts 13, each terminating adjacent bars 12, are secured by welding to the under side of piston head 11. To the skirts are secured spaced arcuate bands 14 of fibrous material, such as leather, adapted to contact the wall of the cylinder; and between the bands 14 of leather are positioned fibrous bands 16 of lubricant impregnated material such as felt, to insure lubrication. On the top of piston head 11 is floatingly mounted a seal 17 of resilient material, such as a rubber plate having a flexible side flange 18 adapted to engage the cylinder wall. The floating mounting is obtained by securing the seal between plates 19, by means of bolt 20 and nut 21. Bolt 20 has its lower end projecting through an enlarged aperture 22, formed in piston head 11; and it is held to piston head 11, by washer 23 and cotter pin 24. The described mounting construction permits the seal to yield laterally and thereby insure a tight non-leaking fit at all times.

Over the piston, is slidable cylinder 33 which is adapted to contact leather bands 14, felt lubricant band 16 and rubber seal 17. The cylinder includes a sleeve portion and a dome portion welded together, as indicated at $33^1$, and is mounted on pin 34, which extends through elongated slots 36 formed by the space between each pair of bars 12. Pin 34 is journaled in lifting arms 7, thus allowing rocking or pivotal movement of the cylinder relative to the lifting arm, when fluid pressure is applied to the piston head 11 to effect elevation of the lifting arm. Slots 36 extend all the way to the piston head 11, thus providing for maximum degree of elevation when fluid pressure is applied; the head 11 serving as a stop. Also, slots 36 are of such length as to prevent the lifting arm being elevated above dead center, thus permitting ready lowering of the lifting arm under a load. Inasmuch as pin 34 extends all the way through cylinder 33 and is adapted to contact the side walls of slots 36, the pin will act to reinforce the structure against torsional stresses which might be imposed by a heavy load on the lifting arm.

The means for allowing introduction of air under pressure into the cylinder to cause movement thereof, and consequently elevation of the lifting arm, comprises pipe 37 connected to the dome portion of the cylinder. A two way valve 38 having air inlet 39 and outlet 41 is positioned in pipe 37. Inlet 39 is preferably of the type commonly employed on automobile tires, so that air lines generally in garages and similar places may be applied thereto to cause introduction of air into the cylinder. By turning handle 42 of outlet 41, air pressure in the cylinder can be reduced by escape of air to allow lowering of the lifting arm after it has been elevated.

We employ means independent of the fluid means to support automatically the lifting arm in elevated position. This will reduce stresses on the apparatus and serve as a protection to workman, who might be working underneath a vehicle which is held in elevated position by the lift. The automatic supporting means, includes ratchet 51 mounted for pivotal and rocking motion on the carriage and journaled on the main supporting axle 2; the ratchet being positioned between the pairs of bars 12. To the web of one of bars 12 of a pair (the righthand pair of Fig. 4) is secured a metal spring strap 52 (Fig. 8) adapted to bear against a projecting end of rod 53, which is secured, preferably by welding, to ratchet 51. Spring 52, consequently, urges the ratchet in the direction of movement of the lifting arm, piston and cylinder, so that pin 34 may automatically rest in the notches 57 of the ratchet, as the lifting arm is being elevated.

It is thus seen that after the lifting arm has been elevated by the fluid means, it may be entirely supported in elevated position by the ratchet mechanism described; and air can be let out of the cylinder to allow for such supporting of the lifting arm. When it is desired to lower the lifting arm, air can be re-introduced into the cylinder to raise the pin 34 off the notch 57 upon which it rests; means being provided to cause the ratchet to be swung away, thereby allowing the lifting arm to lower under the cushioning action of air which is allowed to escape from the cylinder.

The means for swinging the ratchet away comprises strap 58, which is slidably mounted between pins 59 and the web of the left bar 12 in Fig. 4. Strap 58 terminates, at its lower end, in an outwardly projecting flange 61, and at its upper end, in a stop 62. A cam arm 63 is secured to strap 58, and has a cam portion 64 adapted to bear against a projecting end of rod 53, opposite to the end thereof contacting spring 52. When strap 58 is moved to an elevated position (Fig. 3) cam surface 64 thrusts rod 53 and the ratchet outwardly against the action of spring 52. Hence, the lifting arm can be lowered from the position shown in Fig. 3. However, when lowering of the lift obtains, the lower end of cylinder 33 strikes against flange 61, to thrust strap 58 downwardly, and thereby effect disengagement of cam surface 64 from against rod 53. Spring 52 can then act to thrust automatically the ratchet to operative position for the succeeding lifting operation. Flange 61 also provides a handle, whereby strap 58 may be shoved upwardly to cause engagement of cam surface 64 with rod 53, when it is desired to lower the lift from elevated position.

Adjacent the free end of the lifting arm, a supporting structure is provided, which is particularly adapted for holding the axle of an automobile to be lifted. The support extends transversely of the lifting arm and comprises a V-shaped or forked frame having side bars 71, in the form of I-beams, to which are secured a front cross bar 72 and a rear cross bar 73; and to the underside of cross bars 72 and 73 is secured a longitudinally extending T-beam 74. The web of T-beam 74 is mounted (Fig. 9) on pin 9; the pin passing through an enlarged aperture 76 formed in the web. A transverse bar 77 is removably mounted in apertures formed in arms 7, which are notched at 78 to accommodate bar 73; the T-beam 74 being adapted to bear up against bar 77 under a load. Side members 1 of the carriage are preferably notched at 79, to accommodate bar 72.

On the forward ends of side bars 71 are removably mounted brackets 83, having laterally offset curved saddles 84 adapted to provide spaced holding means for firmly supporting the axle of a vehicle at spaced positions. The saddles 84, since they are curved, will allow sliding of the axle therein, as the vehicle is being lifted, and thereby provide a firm support regardless of the degree of elevation of the vehicle.

Inasmuch as the saddles 84 are offset with respect to sockets 86 adapted to slip onto the front ends of bars 71, it is evident that by interchanging the brackets 83 on bars 71, the spacing between the saddles 84 can be varied to give either a narrow, or a wide spacing as indicated by dotted lines in Fig. 1. This enables the device to be used for any type of axle construction, particularly the rear axle of a vehicle, where the differentials are of different width and size.

As was previously explained, aperture 76 in the web of T-beam 74 is of larger size than the diameter of pin 9. This form of mounting will allow transverse movement or sidewise play of the forked support relative to the lifting arm, as well as rocking movement. Therefore, should the tires of a vehicle happen to be unevenly inflated or if the carriage is not mounted on a level floor, the ends of the support can readily accommodate themselves to such conditions upon lifting of a vehicle. Furthermore, since a vehicle when being lifted at one end tends to sway laterally about the other end as a pivot, the transverse movement of the support will allow it to accommodate itself to such swaying, thus reducing strain upon the apparatus.

In some instances, modern automobiles, which are built low to the ground, have obstructions in front of the axles which might interfere with insertion of bracket saddles 84 below an axle. Under such circumstances, bar 77 can be removed and the entire forked support tilted or dipped downwardly about pin 9 as a pivot, by pulling upwardly on handle 87 secured to the rear of T-beam 74, as is indicated by dotted lines in Fig. 2. This will allow clearing such obstructions; and when the saddles 84 are in proper position, handle 87 can be pushed downwardly, and bar 77 can be inserted over T-beam 74 to provide an abutment for holding the forked support when the lifting arm is being elevated.

From the preceding description, it is seen that we have provided a lift which is simple in construction and economical to manufacture. Its portability enables it to be moved about readily from place to place, as may be necessary; and for the latter purpose, the lift is preferably provided, at its rear end with handles 88. Any suitable material, preferably steel or a similar metal can be employed for making the device. Although we have described the lift with respect to the preferred embodiment, as being especially adapted for elevating automobiles, it is apparent that it can be employed for elevating other devices and in other forms, within the scope of the following which we claim as our invention.

We claim:

1. A portable lift comprising a carriage including spaced frame members having substantially parallel portions adjacent one end of the carriage, a lifting arm movably connected to said carriage, a load supporting axle mounted on said substantially parallel portions, a wheel mounted on each end of the axle, fluid operable means for effecting elevation of said lifting arm including a piston member and a cylinder member, one of said members being mounted for rocking movement on the axle, and the other of said members being movably connected to said arm.

2. A portable lift comprising a carriage of generally triangular shape and including spaced frame members having substantially parallel portions adjacent one end of the carriage, a lifting arm pivotally connected to said carriage adjacent said end, a wheel mounted adjacent the opposite end of said carriage, a load supporting axle mounted on said substantially parallel portions, a wheel mounted on each end of the axle, a piston mounted for rocking movement on said axle, a cylinder slidable on said piston and movably connected to said arm, and means whereby movement of the cylinder on the piston can be effected by fluid pressure to elevate said arm.

3. A lift comprising a carriage, a lifting arm movably mounted on said carriage, fluid operable means including a piston member and a cylinder member for effecting elevation of said arm, one of said members being mounted for rocking movement on said carriage and the other of said members being movably connected to said arm, means whereby relative movement between said cylinder and piston can be effected by fluid pressure to elevate said arm, a ratchet mechanism movably mounted on said carriage for supporting said arm in elevated position, means for urging the ratchet mechanism in the direction of movement of said arm as it is being elevated, means for effecting release of said ratchet mechanism in elevated position of said arm and against the action of said urging means to allow lowering of the arm, and means for automatically conditioning said ratchet mechanism for a succeeding lifting of the arm.

4. A lift comprising a carriage, a lifting arm movably mounted on said carriage, a piston mounted for rocking movement on said carriage, a cylinder slidable on said piston and movably connected to said arm, means whereby relative movement between said cylinder and piston can be effected by fluid pressure to elevate said arm, a ratchet mechanism movably mounted on said carriage for supporting said arm in elevated position, spring means for urging the ratchet mechanism in the direction of movement of said piston when the arm is elevated, means including a cam movably mounted on said piston and having a position for holding the ratchet against the action of said spring means, and a member movable with said cam and adapted to be contacted in a lowered position of said lifting arm for effecting movement of the cam from said cam position thereby allowing the spring means to act on the ratchet mechanism.

5. A lift comprising a carriage, a lifting arm movably connected to said carriage, a support for the object to be lifted positioned adjacent the free end of said arm, means for mounting said support for transverse, rocking and tilting movement relative to said arm, and means for elevating said arm.

6. A lift comprising a carriage, a lifting arm movably connected to said carriage, a support for the object to be lifted positioned adjacent the free end of said arm, means for mounting said support for transverse, rocking and tilting movement relative to said arm, means for elevating said arm, and means serving to hold the support against said tilting movement when the arm is being elevated under a load.

7. A lift comprising a carriage, a lifting arm movably connected to said carriage, a support for the object to be lifted positioned adjacent the free end of said arm, means for mounting said support for tilting movement relative to said arm to allow tipping of the support under the object, and selective means serving to hold the support against said tilting movement.

8. A lift comprising a carriage, a lifting arm movably connected to said carriage, a bearing member adjacent the free end of said arm and extending transversely with respect thereto, a support for the object to be lifted and having an aperture therein of larger cross-sectional area than that of said bearing member, the bearing member passing through said aperture, removable means on said lifting arm against the underside of which the support is adapted to abut, and means for elevating said arm.

9. A lift comprising a lifting arm, and means for removably mounting spaced but interchangeable brackets adjacent the free end of said lifting arm, each of said brackets having a laterally offset portion adapted to hold an object, whereby by interchange of said brackets on said means the space between said portions can be changed.

ALEXIS JACKSON.
OSCAR L. TENNANT.